United States Patent [19]

Schavilje et al.

[11] Patent Number: 4,655,423
[45] Date of Patent: Apr. 7, 1987

[54] PLASTIC CLIP WITH INTEGRAL NAIL

[75] Inventors: John N. Schavilje, Mt. Prospect; E. Grant Swick, Bartlett, both of Ill.

[73] Assignee: Illinois Tool Works Inc., Chicago, Ill.

[21] Appl. No.: 740,154

[22] Filed: Jun. 3, 1985

[51] Int. Cl.⁴ ............................................. F16B 21/20
[52] U.S. Cl. ......................................... 248/71; 227/9; 248/547; 248/216.1
[58] Field of Search ...................... 248/71, 547, 216.1, 248/493, 304, 546; 227/9; 411/441, 439

[56] References Cited

U.S. PATENT DOCUMENTS

| | | | |
|---|---|---|---|
| 3,491,972 | 1/1970 | Townshend | 248/71 |
| 3,515,363 | 6/1970 | Fisher | 248/71 |
| 3,529,795 | 9/1970 | Van Niel | 248/71 |
| 3,638,892 | 2/1972 | Boye et al. | 227/9 X |
| 3,861,631 | 1/1975 | Shorin | 248/546 |
| 4,094,490 | 6/1978 | Einhorn | 248/547 X |

FOREIGN PATENT DOCUMENTS 77949  8/1976  Australia .............................. 411/441

Primary Examiner—Ramon S. Britts
Assistant Examiner—Karen J. Chotkowski
Attorney, Agent, or Firm—J. P. O'Brien; T. W. Buckman

[57] ABSTRACT

A plastic molded fastener is described as formed with a fastening clip and drive pin. The fastening clip has an elongate base member with an integrally formed clip member at one end and a mounting aperture adjacent the other end. The plastic drive pin extends generally perpendicular to the base member and has its pointed end held in a pre-driven position within the mounting aperture by a frangible connection. A collar is integrally formed on the base member about the mounting aperture for providing a snap fitting connection which is adapted to hold a driving tool in a stationary position. The snap fitting connection allows the drive pin to be consistently driven by the driving tool in a perpendicular path relative to the base member.

1 Claim, 6 Drawing Figures

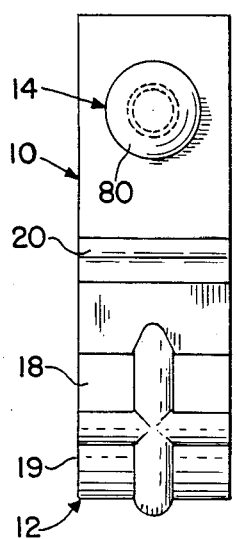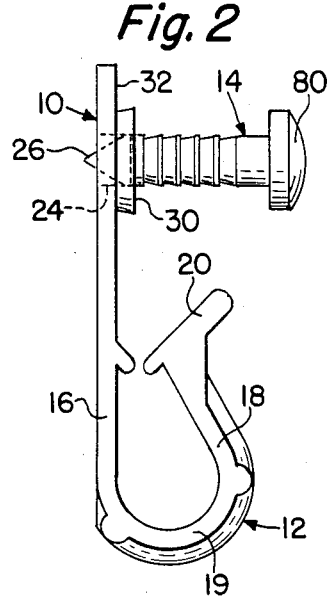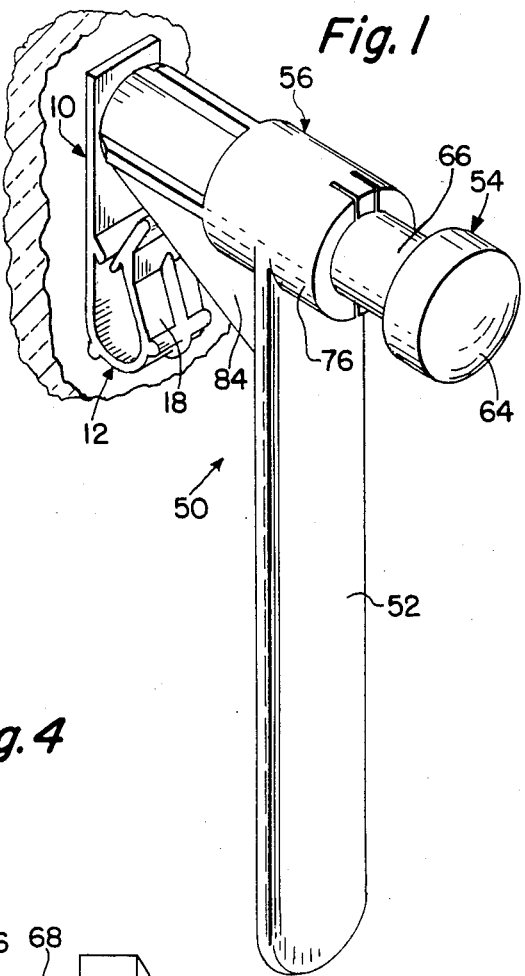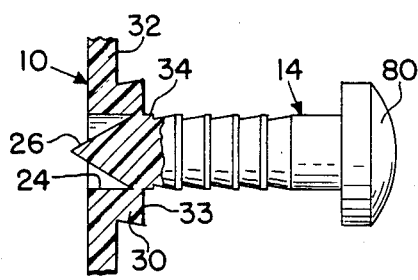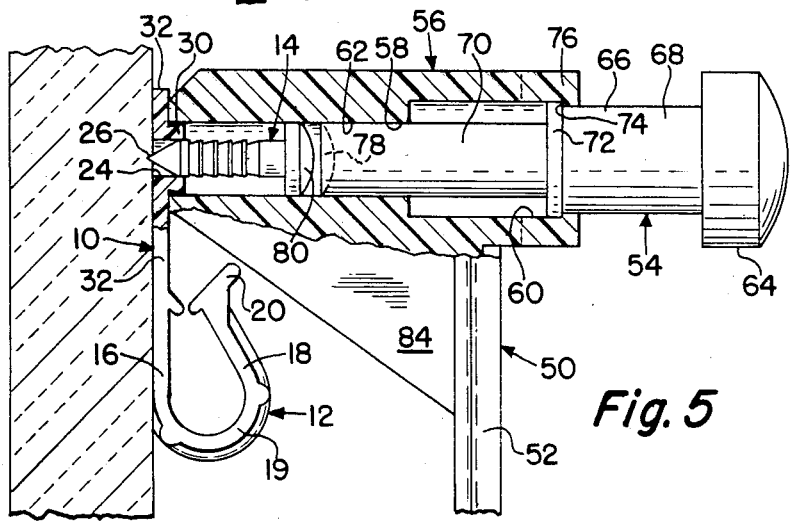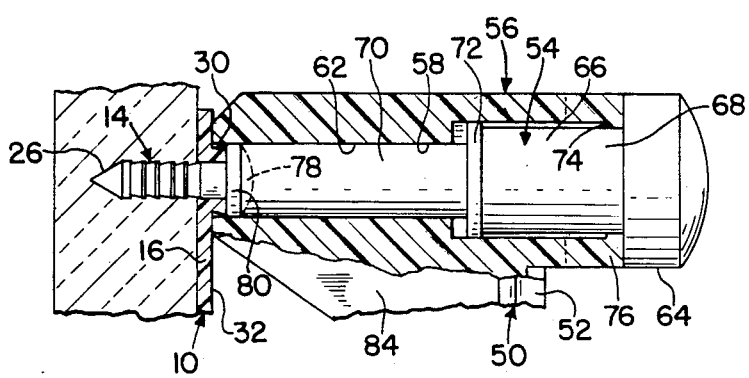

PLASTIC CLIP WITH INTEGRAL NAIL

BACKGROUND AND SUMMARY OF THE INVENTION

This invention relates to fastening clips for electrical cables or the like. In particular, this invention relates to a combined plastic molded fastener formed with a plastic drive pin supported in a pre-driven position on the base of a fastening clip.

In the installation of fastening clips of the type for supporting a wire or cable at spaced intervals along a wall surface, the installer frequently encounters the problem of mounting the clip in an inexcessible location. This invention overcomes the installation problem by providing a tool retention means on the fastening clip about the pre-driven pin for providing a snap fitting connection between the drive tool and clip. By providing this snap fitting connection, the user can install the clip in difficult to reach positions by manipulating the handle of the drive tool and then striking the drive tool with a hammer to drive the pin straight into the wall surface.

A plastic molded fastener constructed in accordance with the principles of this invention is formed as a one-piece construction having a drive pin disposed in a pre-driven position within a mounting aperture on the portion of a fastener clip. A collar means is integrally formed about the mounting aperture for providing a snap fitting connection to hold a drive tool in a stationary position such that the drive tool will consistently push the drive pin in a perpendicular path relative to the clip's base.

DESCRIPTION OF DRAWING

For a better understanding of this invention, reference may be made to the accompanying drawing, in which:

FIG. 1 is a perspective view illustrating the preferred embodiment with a driving tool coupled thereto and held in a position to install the fastener clip to a substrate surface;

FIG. 2 is a side elevational view of the preferred embodiment of this invention;

FIG. 3 is a top plan view of the preferred embodiment illustrated in FIG. 2;

FIG. 4 is a enlarged partial view of FIG. 2 illustrating the frangible connection between the drive pin and the base of the fastener clip;

FIG. 5 illustrates a portion of the drive tool in sectional view prior to the driving of the drive pin into a substrate surface;

FIG. 6 is identical to FIG. 5 with the drive tool illustrated after it has been actuated to drive the pin into the substrate surface.

DESCRIPTION OF PREFERRED EMBODIMENT

Referring now to FIGS. 2, 3 and 4, there is illustrated a plastic molded fastener generally designated by the reference numeral 10. Fastener 10 is integrally molded as a one-piece assembly consisting of a fastening clip 12 and a plastic drive pin 14.

Fastening clip 12 has an elongate base member 16 and a resilient clip member 18. The clip member 18 has a resilient bowed arm portion 19 which terminates a short distance from the base member 16. A finger holding knob 20 is formed at the outer end of the resilient arm portion 19 to permit the user to readily insert a cable or wire therein. Upon releasing the finger holding knob 20, the resilient bowed arm portion 19 returns to the position of FIG. 2 to retain the wire therein. A resilient clip which is similar in construction to clip member 18 is disclosed in U.S. Pat. No. 3,491,971.

At the end opposite to the resilient arm portion 19, base member 16 has a mounting aperture 24. Drive pin 14 has its pointed end 26 extending through the mounting aperture 24 in the pre-driven position of FIG. 2.

As will be described in further detail hereinafter, collar 30 is integrally formed on the upper surface 32 of base portion 16 and has a central opening coaxial with opening 24. As best illustrated in FIG. 4, the pointed end 26 of drive pin 14 is molded with a frangible connection to the upper surface of collar 30. This frangible connection forms no part of the invention and is shown in the prior art, such as U.S. Pat. No. 3,266,761. Frangible connection 34 rigidly holds drive pin 14 in a perpendicular relationship relative to the base member 16.

Referring now to FIG. 1, there is illustrated a driving tool generally designated by the reference numeral 50 having a handle 52, an actuator rod 54 and a tubular housing member 56.

The tubular housing member 56 is formed with an axial throughbore 58. A cylindrical annular recess 60 is formed inwardly of axial throughbore 58 at the upper end of housing 56. The smaller diameter portion 62 at the lower end of axial bore 58 is slightly smaller than the outer diameter at the upper end 33 of collar 30 to provide a snap fitting engagement when the tubular housing member 56 is pressed downwardly on the collar 30 of clip portion 12.

Actuator rod 54 has an enlarged head portion 64 at its upper end and an integrally connected shank portion 66. Shank portion 66 is composed of an upper shank section 68 and lower shank section 70 which are separated by spacer member 72. The upper shank section 68 being substantially larger in diameter than the lower shank portion 70.

Spacer element 72 rides in the annular cylindrical recess 60 of axial bore 58 and is trapped within the enlarged diameter portion by virtue of the inturned annular flange 74 formed at the upper end 76 of tubular housing 56.

The lower shank section 70 is of a diameter slightly smaller than the diameter 62 of axial bore 58. There is formed a concaved depression 78 on its lower end face which conforms to the domed shaped head 80 of drive pin 14.

The driving tool 50 is preferrably constructed of a one-piece plastic molded part. A thin triangular shaped web 84 is integrally formed between the inner end of handle 52 and the lower portion of tubular housing 56 for reinforcing the connection between the handle 52 and tubular housing 56.

The position of actuator rod 54 in FIG. 5 and FIG. 6 represents its extreme limits of travel. In FIG. 5, it can be seen that actuator rod 54 can be raised to permit the conical depression 78 at the lower end of plunger 70 to be a short distance above the head 80 of drive end 14. The position of actuator rod 54 in FIG. 6 represents the condition after the drive pin 14 being completely driven through the base member 16. In the FIG. 6 embodiment, the lower peripheral edge of enlarged head 64 abuts against the upper end 76 of tubular housing 56 to act as a stop for actuator rod 54.

As previously mentioned, the driving tool 50 is particularly useful whenever a fastening clip 10 is to be installed in a relatively inaccessible location. On such an occasion, the user would locate the axial throughbore 58 of tubular housing member 56 in alignment with the drive pin 14 and push the tubular housing 56 down over the drive pin 14 until the lower end 80 of tubular housing 54 snap fits over collar 30 as depicted in FIG. 5. The driving tool 50 and associated fastener 10 is then manipulated to the desired location by using handle 52. Once the clip is placed in the desired location, the user can quickly install the clip with several sharp hammer blows to the head 64 of actuator rod 54. The hammer blows drive the drive pin 14 in a perpendicular relationship to the base member 32. The enlarged head 64 striking the upper annular end face of 76 of tubular housing 56 stops the actuator rod 54 from over driving the drive pin 14 as clearly depicted in FIG. 6.

Although we have shown and described embodiment of our invention, it will be appreciated by those skilled in the art that numerous modifications may be made therein without departing from the scope of the invention as described in the following claims.

We claim:

1. A combined plastic molded one-piece fastener composed of a plastic molded drive pin and a plastic molded fastening clip, said clip comprising an elongate rectangular-shaped base member, an integrally formed clip member at one end of said base member having a resilient bowed arm portion, and a mounting aperture formed through said base member at its other end, an integrally formed collar member extending outwardly from one side of said base member and having a central bore aligned with said mounting aperture and of the same diameter as said mounting aperture, said drive pin extending generally perpendicular to said base member and having a pointed end mounted in a pre-driven position within said mounting aperture and said central bore of said collar member by a frangible connection, the exterior of said collar member having a truncated conical shape with its smaller diameter end formed about said mounting aperture, said frangible connection being formed between the largest diameter portion of said pointed end of said drive pin and the circumferential surface which defines said central bore adjacent the larger diameter end of said truncated conical shaped collar member, the length of said pointed end of said drive pin being greater than the sum of the thickness of said mounting aperture in said rectangular-shaped base member measured from said one side to the opposite side of said base member and the length of said integrally formed collar member so that said pointed end extends beyond said opposite side to said base member.

* * * * *